J. F. Still. Heater.

104225

PATENTED JUN 14 1870

Witnesses:
A. Bennerendorf
Geo. W. Mabee

Inventor:
J. F. Still
PER Munn &
Attorneys.

United States Patent Office.

JOHN F. STILL, OF WEST FARMS, NEW YORK.

Letters Patent No. 104,225, dated June 14, 1870.

HEATING-STOVE.

The Schedule referred to in these Letters Patent and making part of the same

To all whom it may concern:

Be it known that I, JOHN F. STILL, of West Farms, in the county of Westchester and the State of New York, have invented a new and useful Improvement in Heaters; and I do hereby declare that the following is a full, clear, and exact description thereof, which will enable others skilled in the art to make and use the same, reference being had to the accompanying drawing forming part of this specification.

This invention relates to improvements in heaters for heating dwellings and the like by means of cold air received into a space between the shell of the combustion-chamber and an outer shell, to be heated and then conveyed to the room to be heated; and It consists in an arrangement in the said space of heating-plates, draught-regulating plates, and a water-reservoir, whereby the air is heated and mixed with the vapor rising from water contained in the said reservoir in a very efficient manner, the said arrangement being such that the heater may be very cheaply constructed.

Similar letters of reference indicate corresponding parts.

Figure 1:
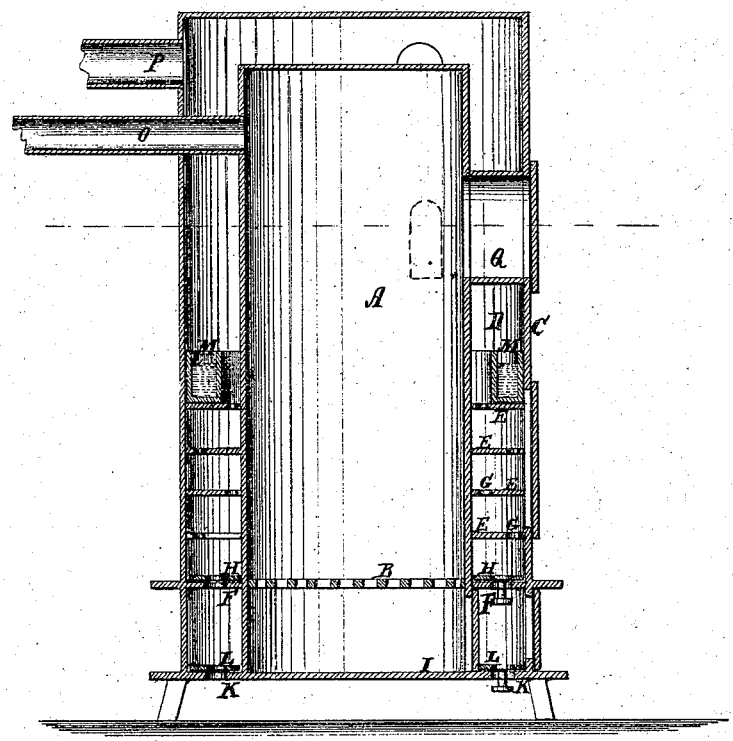
Figure 1 is a sectional elevation of my improved heater.
Figure 2:
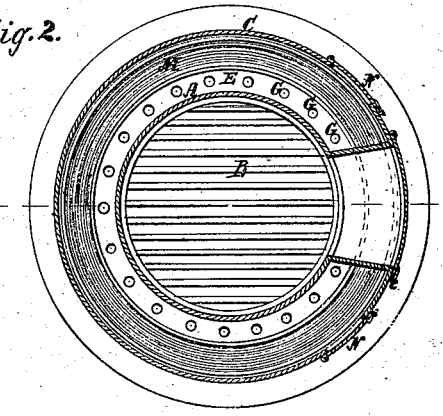
Figure 2 is a horizontal section of the same.

A is the cylinder, within which the fire is to be, upon the grate B.

C is the exterior case, between which and the cylinder is the air-heating space D.

E represents heating-plates encircling the cylinder A, at suitable intervals above the cold-air-draught regulating-plate F. They have holes, G, through them, to allow the air to pass upward slowly, the said holes being arranged so that the currents will not be direct, so that, in rising from one plate to another, the air will impinge upon the lower surfaces of the plates above, and thereby become heated as much as possible.

H is a circular draught-regulating plate, arranged above plate F, to be turned on it for opening or closing the passages.

The bottom plate I of the stove is provided with a number of holes, K, and with a draught-regulating plate, L, above it, designed for use when the heater is set on the floor, (the legs being removed,) to receive the cold air from the cellar below, or through a cold-air conductor leading from the outside of the building to the bottom.

M is a circular water-reservoir, suitably arranged to be placed on either of the plates E, or it may be on the plate F, or the bottom plate I, as may be required, to expose it more or less directly to the heat for more or less rapid generation of vapor.

In case it is placed on the plates F or I, the arrangement of draught-regulating plates will be modified, as required, to admit of their free action.

N represents small openings in the case C, with doors, for supplying water to the reservoirs.

O is the pipe for the escape of the product of combustion, and

P, the heated air-conductor.

Q is the opening for supplying the fuel to the cylinder A.

It will be seen that this arrangement is very cheap and simple, and it is believed that it will be equally as efficient as any now in use.

Having described my invention,

I claim as new and desire to secure by Letters Patent—

The combination with the cylinder A and case C, of the perforated heating-plates E, the perforated bottom plate I, heating and draught-regulating plate F, and regulating-plates H L, and the water-reservoir, all substantially as specified.

The above specification of my invention signed by me this 9th day of May, 1870.

JOHN F. STILL.

Witnesses:
GEO. W. MABEE,
ALEX. F. ROBERTS.